Figure 1:
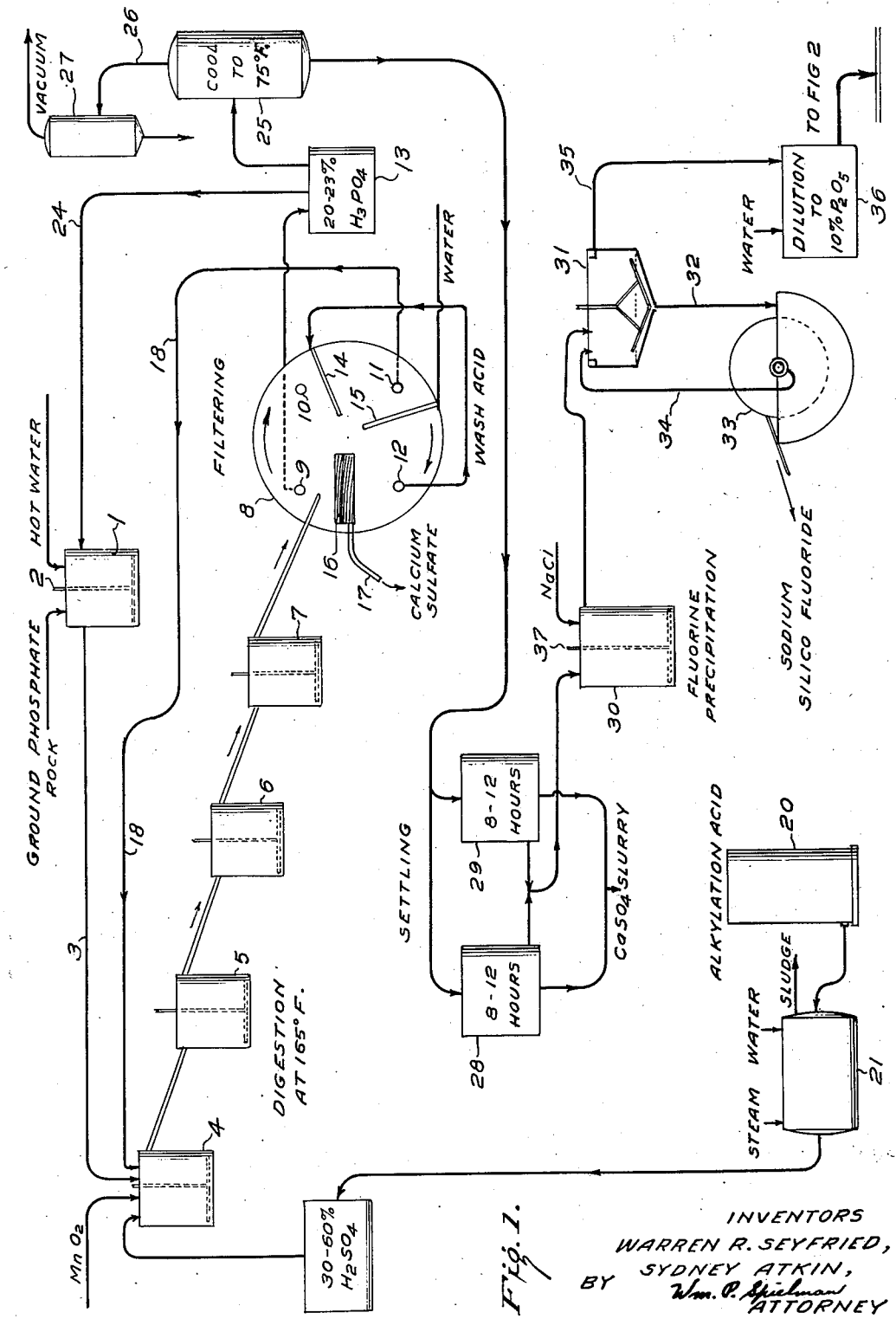

INVENTORS
WARREN R. SEYFRIED,
SYDNEY ATKIN,
BY Wm. P. Spielman
ATTORNEY

July 16, 1957 W. R. SEYFRIED ET AL 2,799,557
PRODUCTION OF FEED GRADE DICALCIUM PHOSPHATE
Filed Oct. 11, 1952 2 Sheets-Sheet 2
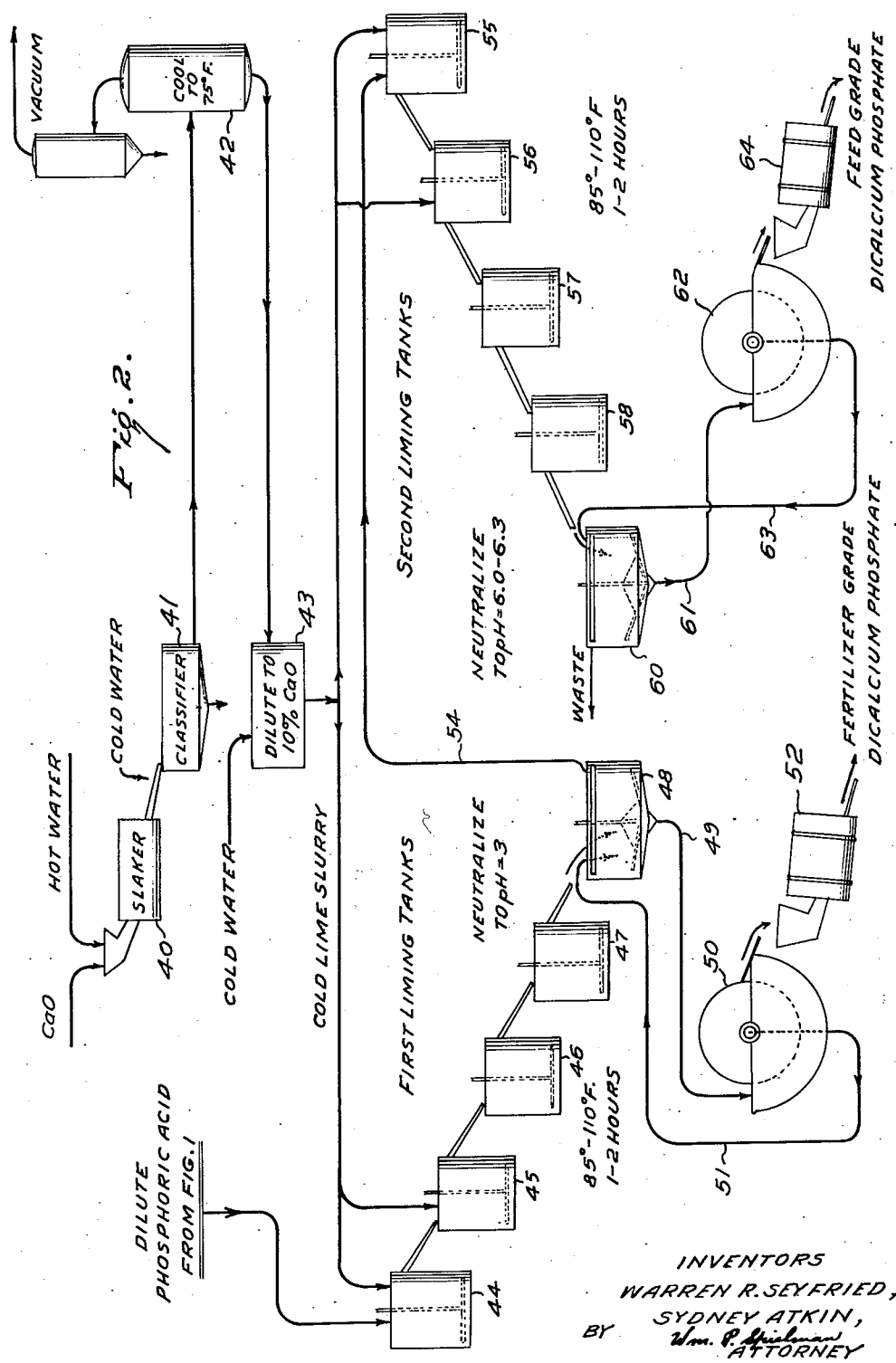
INVENTORS
WARREN R. SEYFRIED,
SYDNEY ATKIN,
BY
ATTORNEY

United States Patent Office 2,799,557
Patented July 16, 1957

2,799,557
PRODUCTION OF FEED GRADE DICALCIUM PHOSPHATE

Warren R. Seyfried, Bronxville, N. Y., and Sydney Atkin, Springfield, N. J., assignors to Chemical Construction Corporation, New York, N. Y., a corporation of Delaware Application October 11, 1952, Serial No. 314,370

7 Claims. (Cl. 23—109)

This invention relates to the production of aqueous phosphoric acid solutions by treating tricalcium phosphate rock with acids, and to the production of a substantially pure dicalcium phosphate from the phosphoric acid solutions so obtained. The invention consists in the novel combinations of process steps and in the particular control features thereof, as will be hereinafter more fully described.

The production of calcium phosphate fertilizers from tricalcium phosphate rock by digesting the rock with sulfuric acid or other mineral acids is of course well known. In fertilizer manufacture the fluorine, silica, iron and other metallic impurities of the phosphate rock present no particular difficulty, since their presence in the fertilizer product is not especially harmful. In manufacturing pure grades of calcium phosphates, however, the removal of these impurities has presented serious difficulties.

It is a principal object of the present invention to produce feed grade dicalcium phosphate, a product that is substantially free from fluorine and iron and which can therefore be used as a cattle feed supplement. A dicalcium phosphate containing less than 0.1% of fluorine is required for this purpose, and such a product is obtainable by the process of our invention.

A further object of the invention is the provision of a process that is particularly well adapted for large-scale manufacture, using cheap and easily available reagents and carried out with standard manufacturing equipment.

A particularly important feature of the process of our invention is based on our discovery that alkylation sulfuric acids, obtained as by-products from the treatment of olefins with sulfuric acid, can be used for the phosphate rock digestion, and that a substantially pure and commercially acceptable dicalcium phosphate product is obtainable with this impure acid in spite of its content of carbonaceous impurities.

For the accomplishment of the above and other objects the invention consists, therefore, in certain of the individual process steps and in the combinations thereof, and in the novel results obtained therefrom, as will hereinafter be fully described with reference to the accompanying drawing and pointed out in the appended claims.

The process

In the process of our invention the first step involves the digestion of ground fluorapatite rock containing fluorine, silica, and iron and other metallic impurities with sulfuric acid under conditions resulting in the extraction of substantially all of the $P_2O_5$ values from the rock. Preferably the digestion is carried out in the presence of recycled impure dilute phosphoric acid from the filtration step. This digestion produces a slurry of calcium sulfate in an aqueous impure phosphoric acid solution containing a large proportion of the fluorine and metallic impurities dissolved from the rock. As one important feature of the invention the digestion is carried out in the presence of sufficient manganese dioxide or other suitable oxidizing agent to maintain these dissolved metallic impurities in a completely oxidized condition.

Following the digestion step, the slurry is filtered and the filter cake is washed, first with dilute aqueous phosphoric acid from the second washing and then with water, the wash acid draining from the first washing step being returned for use in the digestion of additional quantities of phosphate rock. The primary filtrate is cooled, settled to remove residual calcium sulfate, and agitated with a hydrofluosilicic acid precipitating agent to precipitate out a major proportion but not all of the dissolved silica and fluorine. The resulting semi-purified and cold phosphoric acid is diluted with water and subjected to a two-stage partial neutralization. This dilution and two-stage neutralization constitutes a major feature of our invention, since by its use we have succeeded in removing substantially all of the residual fluorine and silica and metallic impurities in a first partial neutralizing step while producing a fertilizer grade dicalcium phosphate of definite commercial value, thereby forming a purified dilute phosphoric acid solution from which pure feed grade dicalcium phosphate can be obtained by the second neutralization.

Digestion and first filtration

These two steps, as well as the remaining steps of the process, will be described with reference to the accompanying drawing. The two figures of this drawing, taken together, constitute a flow sheet of the process wherein the type of equipment used is illustrated diagrammatically.

Referring to the drawing, the tank 1 is a premixing tank provided with an agitator 2 in which finely ground tricalcium phosphate rock is slurried with water and with dilute aqueous phosphoric acid from the process. The quantities of recycled phosphoric acid supplied to this tank and of wash acid employed in the first digestion tank are correlated with the strength and quantity of the sulfuric acid used so that a relatively dilute phosphoric acid solution of about 15–25% $P_2O_5$ content will be produced. We have found that a crystalline hydrated calcium sulfate capable of being filtered and washed rapidly is obtainable by this procedure.

From the premixing tank 1 the slurry is pumped through line 3 into digestion tank 4, which is the first of a series of tanks 4–7 operating in cascade. Each tank is equipped with a suitable agitator to maintain the solids in suspension as the digestion proceeds. In the tank 4 the phosphate rock slurry is mixed with sufficient sulfuric acid to convert substantially all of its tricalcium phosphate content into calcium sulfate and aqueous phosphoric acid. The greater part of the fluorine content of the phosphate rock is also brought into solution together with a corresponding quantity of silica, the reactions being as follows:

(1) $\quad CaF_2 + H_2SO_4 = CaSO_4 + 2HF$
(2) $\quad 6HF + SiO_2 = H_2SiF_6 + 2H_2O$ Most of the iron, alumina and other metallic impurities of the phosphate rock are also dissolved during the digestion step, being converted into their water-soluble sulfates. Because of the relatively high dilutions maintained in our process it is important to bring these metals into solution in their oxidized condition (i.e., the iron as ferric iron, etc.) and this is accomplished by carrying out the acid digestion in the presence of an oxidizing agent. We prefer to use manganese dioxide for this purpose; however it will be understood that other oxidizing agents such as chlorine, sodium permanganate, sodium or calcium hypochlorite and the like may be employed. A quantity of oxidizing agent sufficient to oxidize all of the dissolved metallic impurities is used; the exact amount will of course depend on the particular phosphate rock.

In order to obtain a relatively rapid and complete digestion of the phosphate rock and to form a readily filterable calcium sulfate we carry out the digestion at elevated temperatures on the order of 140°–190° F. using an 0.5–6% excess of sulfuric acid over that theoretically necessary to dissolve the acid soluble constituents of the rock. Using these conditions we find that about 90–96% of the $P_2O_5$ content of the rock can be extracted in from 1½ to 2½ hours. As has been stated, the elevated digestion temperatures and relatively dilute conditions employed, together with the presence of recycled phosphoric acid, promote crystal growth of the calcium sulfate formed in the reaction so that the slurry leaving the last digestion tank 7 is easily filterable.

Filtration is preferably carried out on a rotary platform filter 8 provided with a filter cloth but without using a filter aid. In other words the filter cloth is not precoated with diatomaceous earth or other finely divided solids that are frequently used in filtration. The platform filter 8 consists essentially of a circular filter carried on a large ball race resting on a filter pan and rotated by a chain drive in the clockwise direction shown by the arrows. The filter pan is divided into four sections having separate outlets 9, 10, 11 and 12, respectively. The sections communicating with outlets 9 and 10 are filter sections from which the primary filtrate is pumped to storage tank 13, as shown on the drawing. The sections communicating with outlet pipes 11 and 12 are wash sections, being provided with spray pipes 14 and 15 for the application of wash acid and of water, respectively. The wash acid supplied to spray pipe 14 is a dilute phosphoric acid of about 5% $P_2O_5$ content taken from outlet pipe 12, while hot water is supplied to the spray pipe 15. The liquor from the first wash section, obtained from outlet pipe 11, is a dilute phosphoric acid of 12–13% $P_2O_5$ content, a part or all of which is recycled through line 18 to digestion tank 4 for use in digesting further quantities of ground phosphate rock. If a part only of this wash acid is so used, the remainder may be mixed with the primary filtrate in storage tank 13 or it may be cooled and pumped into the dilution tank 36.

It will be noted that the digestion liquor is filtered hot, 165° F. being a preferred temperature. At this temperature a rapid removal of the calcium sulfate is possible and a relatively thick and easily washable filter cake is formed that can be removed continuously by a rotary scroll 16 and discharged through outlet pipe 17. At temperatures within the range of 140°–190° F., however, calcium sulfate is appreciably soluble, and therefore the filtrate will contain substantial quantities of calcium sulfate. This is removed by the cooling and settling procedure that will be subsequently described.

Utilization of alkylation acid

It is an important advantage of our above-described digestion and filtration process that it permits the utilization of carbon-containing sulfuric acids such as those obtained from olefin alkylations. It will be understood, of course, that the process will work equally well with pure sulfuric acid, and such pure acid may be used if desired; however the utilization of alkylation acid presents an important feature of economy. Alkylation sulfuric acid is obtained from a number of industrial sources, and at a wide variety of concentrations. One of the most important sources is from the production of isopropanol and other alcohols by sulfating the corresponding olefins with strong sulfuric acid, followed by hydrolysis. Sulfuric acid from this source is usually obtained at about 50% $H_2SO_4$ content; it contains up to 1–2 percent of carbonaceous tarry matter.

Alkylation acid from the alkylation of paraffins with olefins, particularly the alkylation of isobutane with butenes in gasoline manufacture, constitutes another large source of waste sulfuric acid that can be used in practicing this feature of our invention. The alkylation process is described, for example, in "Conversion of Petroleum" by A. N. Sachanen (1940) pages 27–31. The spent alkylation acid from this source is usually of about 90% strength and may contain up to 7–10% of carbonaceous material. Referring to Fig. 1 of the drawing, this alkylation acid stored in tank 20 may be treated in tank 21 with steam and water to break up as much as possible of the olefin sulfates and separate out the highly unsaturated hydrocarbons that are soluble in concentrated sulfuric acid. The hydrocarbons form an upper sludge layer that can be skimmed off; the remaining sulfuric acid of 30–60% $H_2SO_4$ content may contain up to several percent of finely divided carbonaceous material. Carbon-containing sulfuric acid from other sources may also be used.

We have found that when alkylation sulfuric acid is employed in the digestion of phosphate rock the greater part of its carbonaceous impurities is absorbed by the calcium sulfate, and is removed in the first filtration. Most of the remaining carbonaceous material, not taken out by the calcium sulfate filtration, is brought down with the iron and other metallic impurities during the first liming step, and therefore comes out in the fertilizer grade dicalcium phosphate. We find, therefore, that even with highly impure alkylation acids the feed grade dicalcium phosphate constituting the principal product of our process is only slightly darkened in color, and is entirely acceptable as a cattle feed.

Cooling and settling the filtrate

The primary filtrate from the filter 8 is an aqueous phosphoric acid of about 15–25% $P_2O_5$ content. A portion of this filtrate is recycled through line 24 to tank 1; the remainder is cooled to a temperature not higher than about 100° F. and allowed to stand for at least 8 hours in order to settle out the remainder of the calcium sulfate. Although any suitable cooling means may be employed, such as by providing closed coils supplied with cooling water, we prefer to accomplish the cooling by vacuum evaporation. Accordingly, the phosphoric acid is pumped into a flash cooling tank 25 which is connected through line 26 to a barometric condenser 27 maintained under a partial vacuum; by this means a sufficient quantity of the solution is evaporated to accomplish the desired temperature reduction. A final temperature of 75° F. is preferably maintained. The cooled acid is pumped into settling tanks 28 and 29 where it is allowed to stand for at least 8 hours, a time within the range of 8–12 hours usually being sufficient. On standing finely divided calcium sulfate crystallizes from the cooled solution, and is withdrawn from the bottom of the tanks as a slurry. It will be understood that in the continuous process illustrated several settling tanks are used so that the material in one can remain undisturbed for the required settling time while clarified phosphoric acid solution is being withdrawn from one or more of the others.

Fluorine precipitation

About 80–90% of the fluorine present in the fluorapatite rock as calcium fluoride is dissolved during the extraction. The phosphoric acid solution from the settling tanks 28 and 29 therefore contains about 1–2% of fluorine in the form of hydrofluosilicic acid. We find that a major proportion of this impurity can be removed by adding small quantities of a precipitating agent at this stage of the process. Accordingly, the solution is pumped into a tank 30, provided with a suitable agitator 37, and a precipitating agent is added which will convert the hydrofluosilicic acid into a water-insoluble salt thereof. Preferably sodium chloride is used for this purpose, although other water-soluble sodium salts could be employed. Preferably an excess of salt is added over that theoretically necessary in order to make the fluorine precipitation as complete as possible and obtain a sludge that can be settled out and removed by filtration.

The impure phosphoric acid solution is therefore treated with a 25–100% excess of sodium chloride in the tank 30 and the mixture is agitated for about 20–40 minutes to bring about the reaction (3)   $H_2SiF_6 + 2NaCl = Na_2SiF_6 + 2HCl$ The resulting slurry is run into a classifier 31 wherein settling is carried out with slow agitation for about 1 hour. The underflow is passed through line 32 to a vacuum filter 33 where the insoluble sodium silicofluoride is removed, the filtrate being returned to the thickening tank 31 through line 34. About 70–75% of the fluorine is removed by this procedure, reducing to about 0.4% the fluorine content of the semi-purified phosphoric acid overflowing the tank 31 through line 35.

*Dilution and stepwise neutralization*

In order to remove the remainder of the fluorine, together with the oxidized metallic impurities in the phosphoric acid solution, a two-stage neutralization is employed. We have found that substantially all of the remaining impurities can be precipitated in the first partial neutralization stage, which is carried to a controlled pH value within the range of 2.6 to 3.2 provided the phosphoric acid is in a dilute condition. Accordingly, sufficient water is added to the acid in the storage tank 36 to bring the $P_2O_5$ content to about 8–12%, and preferably to a 10% concentration. The cold dilute acid is then ready for the stepwise neutralization that is shown on Fig. 2 of the drawing.

The neutralization is carried out by addition of lime, since a calcium salt is the desired final product. The lime may be added either as calcium carbonate, in the form of ground limestone, ground oyster shell and the like, or as calcium hydroxide. We prefer to employ a calcium hydroxide slurry since this avoids the evolution of carbon dioxide which would cause undesirable foaming in the liming tanks. The concentration of the lime slurry is also important since a complete precipitation of the undesired impurities with better filtration characteristics of the resulting slurry is obtained if the pH is raised gradually. Accordingly the calcium hydroxide slurry, after formation in a slaker 40, separation from impurities in a classifier 41 and cooling by flash evaporation in cooling system 42, is diluted with cold water in a tank 43 to a slurry containing about 10% CaO. A portion of this cold dilute lime slurry is added slowly to the diluted phosphoric acid solution in a series of neutralizing tanks 44—47, which tanks are provided with agitators and are arranged in cascade.

Heat generated by the partial neutralization causes the temperature of the liquid within the liming tanks to rise to about 85°–110° F., but care should be exercised to see that it does not substantially exceed this range and the temperature is preferably maintained at 90–100° F. The residence time in the tanks 44—47 is about one to two hours, during which the residual hydrofluosilicic acid and the salts of iron, aluminum and other metallic impurities are precipitated and flocculated along with a minor proportion of dicalcium phosphate. The final pH value in the tank 47 may vary somewhat with the amount and kind of impurities undergoing precipitation; best results are usually obtained when a pH of about 3.0 is maintained. When this is done the purification is accomplished with a loss of only about 15–20% of the phosphoric acid in the solution as impure fertilizer grade dicalcium phosphate. The slurry from the last neutralizing tank 47 is introduced into a settling or classifying tank 48 wherein it is settled with slow agitation to form a sludge of precipitate in the bottom of the tank. A readily filterable sludge containing about 1–1.5% solids is obtained with a settling time of about 1 hour. The thickened sludge is removed from the tank through line 49 and filtered on vacuum filter 50, the filtrate being returned to the tank through line 51. The filter cake is dried in a drier 52 yielding a dicalcium phosphate product of acceptable fertilizer grade.

The purified dilute phosphoric acid overflows from the classifying tank 48 and is pumped through line 54 to the head tank of a set of second liming tanks 55—58. Substantially the same time and temperature conditions are employed in these tanks as were maintained in the tanks 44—47; i. e., temperatures within the range of 85°–110° F. and a treatment time of 1–2 hours. Sufficient of the cold dilute lime slurry is added to raise the pH in the final tank 58 to about 6.0–6.3, at which value substantially all of the remaining phosphoric acid is precipitated as dicalcium phosphate. A higher pH value should be avoided, since over-neutralization might cause the formation of slimes that would interfere with the subsequent settling and filtration procedure. The slurry from the last liming tank 58 is introduced into a classifier or settling tank 60 wherein it is settled with slow agitation for about 1 hour. The dicalcium phosphate slurry is withdrawn through line 61 and filtered on a vacuum filter 62, the filtrate being returned to the settling tank through line 63 and the filter cake being dried in a rotary drier 64. The product is a satisfactory feed grade dicalcium phosphate containing less than 0.1% of fluorine and free from harmful amounts of iron and other metallic impurities. When manganese dioxide is used as the oxidizing agent during the phosphate rock digestion this product will also contain about 0.1% of manganese, which is a desirable element in a cattle feed.

From the foregoing description of a preferred embodiment of our invention it will be seen that all the objects thereof are accomplished. A process is provided that is admirably suited for large-scale continuous manufacture since all the materials are handled as dilute aqueous solutions or slurries. The temperatures used are those easily and cheaply obtainable with ordinary commercial equipment; in fact, the best results in all the steps following the first filtration are obtained at ordinary atmospheric temperatures. High concentrations of corrosive acids and alkalies are avoided, so that the ordinary materials of construction familiar to chemical engineers can be employed. The preferred digesting agent is an impure alkylation sulfuric acid that is obtainable commercially in large quantities as a waste material. The other two raw materials, ground phosphate rock and lime, are also cheap and abundant. The preferred fluorine precipitating agent is common salt, which is of course inexpensive, and the preferred oxidizing agent is manganese dioxide which is likewise cheap and plentiful. With these readily available materials high yields of a purified feed grade dicalcium phosphate are obtained with only a relatively small proportion of impure fertilizer grade material.

The operation of our process will be further described by the following specific example, wherein the results obtainable with particular quantities and types of materials are illustrated in detail.

*Example*

A Florida pebble phosphate rock flotation concentrate was used having the screen analysis —200 mesh 75%, +200 mesh 8.4%, +150 mesh 8.2% and +100 mesh 6.4%. Its chemical analysis was as follows:

|  | Percent |
|---|---|
| Moisture at 105° C | 1.75 |
| Calcium oxide (CaO) | 47.97 |
| Phosphoric acid ($P_2O_5$) | 34.78 |
| Tricalcium phosphate (BPL), dry basis | 75.99 |
| Carbon dioxide ($CO_3$) | 2.63 |
| Oxide of iron | 0.82 |
| Alumina | 1.79 |
| Fluorine (F) | 3.84 |
| Sand and insoluble silicates | 5.39 |

Together with small quantities of arsenic, uranium and vanadium compounds.

An alkylation sulfuric acid was used having a specific gravity of 1.428 at 20° C. and containing 52.0% of titratable $H_2SO_4$ and 0.44% of carbon.

The ground phosphate rock was slurried with aqueous phosphoric acid from the filtering step, as shown on the drawing. Although the process of the invention is essentially a continuous one the relative quantities of reagents are conveniently expressed as batch figures; these can be divided by units of time to convert them into flow rates as lbs. per hour or tons per day. Thus, 344 parts by weight of ground rock are mixed in premix tank 1 with 1000 parts of strong phosphoric acid from the filtrate tank 13 and the resulting slurry is pumped along with 510 parts of weak phosphoric acid into tank 4. To this tank there is added 570 parts of the alkylation sulfuric acid and 0.5–1 lb. of manganese dioxide, the exact amount being such as to produce a concentration of 1 gram per liter in the primary filtrate from the filter 8. Experience has shown that this is sufficient to maintain all the metallic impurities dissolved from the rock in an oxidized condition.

Digestion is carried out in tanks 4 to 7 at temperatures of about 140–190° F. and preferably at about 165° F. during 1.5–2 hours as the mixture flows from tank to tank. Agitation at 100 R. P. M. is maintained in the premix tank 1 and in the first digestion tank. The agitators in the other digestion tanks are preferably operated at about 60 R. P. M. The quantities of acidic materials used (i. e., of sulfuric and phosphoric acids) are such as to convert substantially all of the tricalcium phosphate into calcium sulfate and phosphoric acid together with an excess of about 0.5–6% of sulfuric acid to promote the digestion efficiency and crystal growth of calcium sulfate to a form in which it can be filtered and washed efficiently. Approximately 70–80% of the fluorine together with substantial amounts of the silica and metallic impurities are also dissolved from the rock during the digestion.

By the above-described procedure about 93–96% of the $P_2O_5$ in the phosphate rock is extracted. Most of the carbonaceous impurities introduced with the alkylation sulfuric acid are adsorbed on the surfaces of the calcium sulfate and digestion residue in the slurry and are removed by the first filtration. The reaction mixture leaving the last digestion tank 7 is a filterable slurry of gypsum crystals in an aqueous phosphoric acid solution of about 20–23% $P_2O_5$ content containing about 1–2% of free sulfuric acid. This slurry, 2400 parts in weight, is filtered and washed on the filter 8, the construction and operation of which have been previously described. The filter cake is washed with 210 parts of weak wash acid and with 364 parts of wash water. The following analysis of a sample of the filtrate from the primary filtrate storage tank 13 is typical.

| | Percent |
|---|---|
| Fluorine | 1.60 |
| $CaSO_4$ | 0.75–1 |
| $H_2SO_4$ | 1 |

A portion of this phosphoric acid solution weighing 1000 parts is recycled to the moistening tank 1 for admixture with additional quantities of ground phosphate rock. The remainder, amounting to 543 parts by weight, is cooled to 75° F. by vacuum evaporation and is then passed to one of the two settling tanks 28 and 29 where it is allowed to stand for about 8–12 hours to settle out the calcium sulfate that passed through the filter.

It will be seen, therefore, that the process so far described is one in which the phosphate rock digestion and filtration is carried out at elevated temperatures on the order of 165° F. with recirculated phosphoric acid and with excess sulfuric acid to obtain calcium sulfate in a form in which it can be filtered and washed rapidly. The filtering and washing time on the filter 8 is about 6–15 seconds, producing a filter cake about 1–2 inches in thickness and containing about 30–40% of water. By following this filtration with a cooling and settling procedure, residual calcium sulfate is settled from the filtrate so that a phosphoric acid solution is obtained that is clear after cooling while a rapid rate of filtration is maintained. The filter cake, 717 parts in weight, may be reslurried in water and pumped to a disposal pond.

In order to remove most of the fluorine and silica the phosphoric acid is treated with an excess of sodium chloride in the tank 30. The salt may be introduced either in solid form or as a saturated brine solution; the preferred quantity is 14.6 parts of NaCl or about 125–150% of that theoretically necessary to form sodium fluosilicate by the reaction $$2NaCl + H_2SiF_6 = Na_2SiF_6 + 2HCl$$

The sodium silicofluoride precipitation is carried out by agitating the reagents in the tank 30 for about 15 minutes at 75° F. The resulting slurry is pumped into the thickener or settling tank 31 where the precipitate is settled out with slow agitation and the resulting sludge is drawn off and filtered on the filter 33, the filtrate being returned to the settling tank. About 70–80% of the fluorine is precipitated by this procedure; a filter cake amounting to 18 parts by weight and containing 35% moisture is representative.

The remainder of the process consists essentially in a two-stage neutralization with lime of the purified phosphoric acid, first to convert a minor proportion of the phosphoric acid into a dicalcium phosphate precipitate containing substantially all of the remaining fluorine and the metallic impurities that were dissolved therein and then to form a purified or feed-grade dicalcium phosphate from the remainder. We have found that substantially all of the impurities can be precipitated with only a minor proportion of the phosphoric acid if the lime treatment is carried out in a relatively dilute solution; i. e., one containing about 8–12% of $P_2O_5$, and if the metallic impurities are in an oxidized condition. The first step of this process is therefore a dilution of the overflow from the settling tank 31 with sufficient water to bring its $P_2O_5$ content to about 10%. In the example given, 531 parts by weight of overflow containing 19.4% of $P_2O_5$ are treated by the addition of 500 parts of water, after which the diluted phosphoric acid solution is ready for the first liming treatment.

The concentration and temperature of the lime slurry constitute another important feature of the process. We find that maximum precipitation of the fluorine and oxidized metallic impurities is obtained, together with a marked improvement in the settling and filtering properties of the dicalcium phosphate precipitate, when the lime is added gradually as a cold dilute solution and the mixture is agitated for about 1–2 hours. Accordingly the lime slurry is prepared by first slaking calcium oxide with hot water in a rotary slaker, using 100 parts by weight of 95% CaO and 483 parts of water at 120° F. to form a 25% slurry having a temperature of about 180° F. After settling out and removing grit the slurry is cooled to 75° F. by vacuum evaporation and is diluted to 10% CaO content by dilution with water.

The first liming is carried out with agitation in tanks 44 to 47, the slurry overflowing from tank to tank. To 1030 parts by weight of the cold dilute phosphoric acid solution there is added slowly about 468 parts of the dilute lime slurry, the exact quantity being that which will raise the pH of the phosphoric acid to a value between 2.6 and 3.2, depending on the amount and character of impurities that are to be precipitated. The primary object of this first liming is to precipitate as little as possible of the phosphoric acid as dicalcium phosphate consistent with precipitation of substantially all of the remaining fluorine and the metallic impurities; in most cases this is accomplished by neutralizing to a final pH value of 3 in the final neutralizing tank 47. When this is done about 22% of the phosphoric acid in the solution is converted into a dicalcium phosphate precipitate which also contains about 99% of the remaining fluorine and a quantity of calcium sulfate corresponding to all of the sulfuric acid in the acid solution. With the quantities mentioned above a satisfactory precipitate will contain 55 parts by weight of $CaHPO_4.2H_2O$, 2.81 parts of $CaSiF_6$ and 22.6 parts of $CaSO_4.2H_2O$ together with the phosphates or hydroxides of practically all of the iron, alumina and other metallic impurities. This slurry is thickened in the settling tank 48 from which the resulting sludge is withdrawn through line 49 and filtered on the filter 50, the filtrate being returned to the settling tank.

The overflow from the thickener 48 is pumped into the second set of liming tanks 55 to 58 where it is treated with additional quantities of the same cold dilute lime slurry. For each 1400 parts of overflow solution there is added approximately 470 parts by weight of milk of lime, the exact quantity being adjusted to obtain a final pH of about 6.0–6.3 in the last liming tank 58. We find that neutralization to a pH value within this range will precipitate substantially all of the remaining phosphoric acid from the solution as a purified dicalcium phosphate without forming slimes that would interfere with its subsequent filtration. The neutralized slurry from the tank 58 passes into a thickener 60 from which the underflow passes through line 61 to the vacuum filter 62 where it is filtered and washed. The resulting filter cake, after drying in a kiln 64 is obtained as a feed grade dicalcium phosphate amounting to 197 parts by weight.

What we claim is:

1. A process for the production of feed grade dicalcium phosphate which comprises digesting ground tricalcium phosphate rock containing fluorine and metallic impurities at about 140°–190° F. with sufficient aqueous sulfuric acid to convert substantially all of its tricalcium phosphate to calcium sulfate and aqueous phosphoric acid while simultaneously dissolving most of the fluorine and metallic impurities from the rock, the digestion being carried out in the presence of a quantity of an added oxidizing agent sufficient to maintain the dissolved metallic impurities of the rock in oxidized condition, separating the calcium sulfate from the impure phosphoric acid so produced, cooling and diluting the resulting phosphoric acid solution with water to a temperature not higher than about 100° F. and a $P_2O_5$ content of about 8–12%, adding a quantity of aqueous lime slurry sufficient to raise the pH of the dilute phosphoric acid solution to 2.6–3.2 and agitating the mixture at a temperature not higher than 110° F. to convert a minor proportion of the phosphoric acid into a dicalcium phosphate precipitate containing substantially all of the fluorine and metallic impurities that were dissolved therein, filtering off and recovering this precipitate, agitating the resulting filtrate at a temperature not higher than 110° F. with an additional quantity of lime slurry sufficient to raise the pH to about 6.0–6.3 and thereby converting the remainder of the phosphoric acid therein into feed grade dicalcium phosphate, and filtering off and drying the dicalcium phosphate so obtained.

2. A method according to claim 1 in which the added oxidizing agent is manganese dioxide.

3. A method according to claim 1 in which the sulfuric acid is an alkylation sulfuric acid of about 30–60% $H_2SO_4$ content containing suspended carbonaceous impurities.

4. In the production of a purified dicalcium phosphate from an impure 15–25% aqueous phosphoric acid solution obtained by the acid digestion of phosphate rock and containing dissolved fluorine and metallic impurities the steps which comprise diluting the solution with water to a $P_2O_5$ content of about 8–12%, adding a quantity of an aqueous lime slurry sufficient to raise the pH to 2.6–3.2, agitating the mixture while maintaining a temperature not higher than about 110° F. to convert a minor proportion of the phosphoric acid into a dicalcium phosphate precipitate containing substantially all of said fluorine and metallic impurities, filtering off this precipitate, agitating the resulting filtrate at a temperature not higher than about 110° F. with an additional quantity of aqueous lime slurry sufficient to raise the pH to about 6–6.2 and thereby converting the remainder of the phosphoric acid into a purified dicalcium phosphate, and recovering the purified dicalcium phosphate so obtained.

5. A process for the production of feed grade dicalcium phosphate from ground tricalcium phosphate rock containing fluorine and metallic impurities which comprises digesting said rock at about 140°–190° F. with sufficient sulfuric acid and water to convert substantially all of its tricalcium phosphate to calcium sulfate and an aqueous phosphoric acid solution of about 15–25% $P_2O_5$ content having fluorine compounds and metallic salts dissolved therein, the digestion being carried out in the presence of a quantity of an added oxidizing agent sufficient to maintain said dissolved metallic salts in oxidized condition, filtering said solution at about 140°–190° F. and thereby removing most of the calcium sulfate therefrom, cooling the filtrate to a temperature not higher than 100° F. and allowing it to stand for at least 8 hours and thereby settling out the remainder of the calcium sulfate and drawing off the settlings, precipitating and removing by filtration a major portion of the fluorine compounds in the filtrate, diluting the resulting phosphoric acid solution with water to a $P_2O_5$ content of about 8–12%, adding a quantity of aqueous lime slurry sufficient to raise the pH of the dilute phosphoric acid solution to 2.6–3.2 and agitating the mixture to convert a minor proportion of the phosphoric acid into a dicalcium phosphate precipitate containing substantially all of the fluorine and metallic impurities that were dissolved in the solution, filtering off and recovering this precipitate, agitating the resulting filtrate with an additional quantity of lime slurry sufficient to raise the pH to about 6.0–6.2 and thereby converting the remainder of the phosphoric acid therein into feed grade dicalcium phosphate, and filtering off the dicalcium phosphate so obtained.

6. In a continuous method for the production of dilute phosphoric acid solutions by digesting ground phosphate rock with an equivalent quantity of sulfuric acid and separating the resulting phosphoric acid from calcium sulfate by filtration, the improvement which comprises suspending the ground phosphate rock in a portion of the previously produced phosphoric acid from the filtration step, adding the sulfuric acid to the resulting slurry and carrying out the digestion and filtration at temperatures within the range of 140°–190° F. in the presence of sufficient water to form a dilute phosphoric acid containing about 15–25% $P_2O_5$, whereby the calcium sulfate is formed in a readily filterable and washable form but the content of dissolved calcium sulfate in the filtrate is relatively high, cooling the remainder of the phosphoric acid filtrate to a temperature below 100° F. and settling out the residual calcium sulfate by allowing the cooled solution to stand for at least eight hours.

7. A method according to claim 6 in which the sulfuric acid is an alkylation sulfuric acid containing suspended carbonaceous impurities, the major portion of which are adsorbed on the calcium sulfate and removed by the filtration.

References Cited in the file of this patent

UNITED STATES PATENTS

| | | |
|---|---|---|
| 1,667,549 | Hechenbleikner | Apr. 24, 1928 |
| 1,902,648 | Larsson | Mar. 21, 1933 |
| 2,013,970 | Moore | Sept. 10, 1935 |
| 2,115,150 | Seyfried | Apr. 26, 1938 |
| 2,164,627 | Seyfried | July 4, 1939 |
| 2,233,956 | Moore | Mar. 4, 1941 |
| 2,418,203 | Stauffer | Apr. 1, 1947 |